(12) United States Patent
Seo et al.

(10) Patent No.: US 7,346,096 B2
(45) Date of Patent: Mar. 18, 2008

(54) RECEIVER FOR MOBILE COMMUNICATION SYSTEM

(75) Inventors: Seung Wan Seo, Seoul (KR); Tan Joong Park, Anyang-shi (KR)

(73) Assignee: LG Electronics Inc., Seoul (KR)

( * ) Notice: Subject to any disclaimer, the term of this patent is extended or adjusted under 35 U.S.C. 154(b) by 605 days.

(21) Appl. No.: 10/136,282

(22) Filed: May 2, 2002

(65) Prior Publication Data

US 2002/0163956 A1 Nov. 7, 2002

(30) Foreign Application Priority Data

May 3, 2001 (KR) .......................... 10-2001-23999

(51) Int. Cl.
*H04B 1/00* (2006.01)
(52) U.S. Cl. ..................................... 375/147
(58) Field of Classification Search ................ 375/147
See application file for complete search history.

(56) References Cited

U.S. PATENT DOCUMENTS

| | | | |
|---|---|---|---|
| 5,548,819 A * | 8/1996 | Robb ........................... | 455/59 |
| 6,026,115 A * | 2/2000 | Higashi et al. .............. | 375/148 |
| 6,298,050 B1 * | 10/2001 | van Heeswyk et al. ..... | 370/335 |
| 6,442,155 B1 * | 8/2002 | Suk et al. .................... | 370/342 |
| 6,735,189 B1 * | 5/2004 | Kukla et al. ................. | 370/342 |
| 6,904,106 B2 * | 6/2005 | Papasakellariou et al. .. | 375/341 |
| 6,959,033 B1 * | 10/2005 | McDonough et al. ....... | 375/147 |

FOREIGN PATENT DOCUMENTS

| | | |
|---|---|---|
| EP | 1065807 A1 | 1/2001 |
| JP | 10-303855 | 11/1998 |

OTHER PUBLICATIONS

Harju et al.; "A Flexible Rake Receiver Architecture for WCDMA Mobile Terminals"; Mar. 20, 2001-Mar. 23, 2001; IEEE 0-7803-6720-0/01; pp. 9-12.
Viterbi; "Principles of Spread Spectrum Communication"; Mar. 1997; ISBN 0-201-63374-4; pp. 84-93.
$3^{rd}$ Generation Partnership Project: Technical Specification Group Radio Access Network; Physical Channels and Mapping of Transport Channels onto Physical Channels (FDD) (Release 1999).
Search Report from Japanese Patent Office.

* cited by examiner

*Primary Examiner*—Khanh C. Tran
(74) *Attorney, Agent, or Firm*—Ked & Associates, LLP

(57) ABSTRACT

Disclosed is a receiver capable of simplifying hardware required for finger and combiner in accordance with the channel characteristics in a $3^{rd}$ generation mobile communication system using physical channels recommended by the 3GPP ($3^{rd}$ generation partnership project). The rake receiver for the mobile communication system complying with the 3GPP standard includes fingers for performing in parallel a radio signaling of downlink physical channels recommended in the 3GPP standard and inputted through multiple paths in a first-in first-out (FIFO) manner, combiners for summing a certain channel of different time offsets outputted from the fingers with an identical timing, and a selector for controlling the different physical channels outputted from the fingers to be summed by the different combiners, respectively.

12 Claims, 7 Drawing Sheets

FIG. 1
Related Art

| Channels | Physical Channels |
|---|---|
| DCH | Dedicated Physical Data Channel (DPDCH) |
| | Dedicated Physical Control Channel (DPCCH) |
| RACH | Physical Random Access Channel (PRACH) |
| CPCH | Physical Common Packet Channel (PCPCH) |
| | Common Pilot Channel (CPICH) |
| BCH | Primary Common control Physical Channel (P-CCPCH) |
| FACH | Secondary Common control Physical Channel (S-CCPCH) |
| PCH | |
| | Synchronisation Channel (SCH) |
| DSCH | Physical Downlink Shared Channel (PDSCH) |
| | Acquisition Indicator Channel (AICH) |
| | Access Preamble Acquisition Indicator Channel (AP-AICH) |
| | Paging Indicator Channel (PICH) |
| | CPCH Status Indicator Channel (CSICH) |
| | Collision-Detection/Channel-Assignment Indicator Channel (CD/CA-ICH) |
| HS-DSCH | High Speed Physical Downlink Shared Channel (HS-PDSCH) |
| | HS_DSCH-related Shared Control Channel (HS-SCCH) |

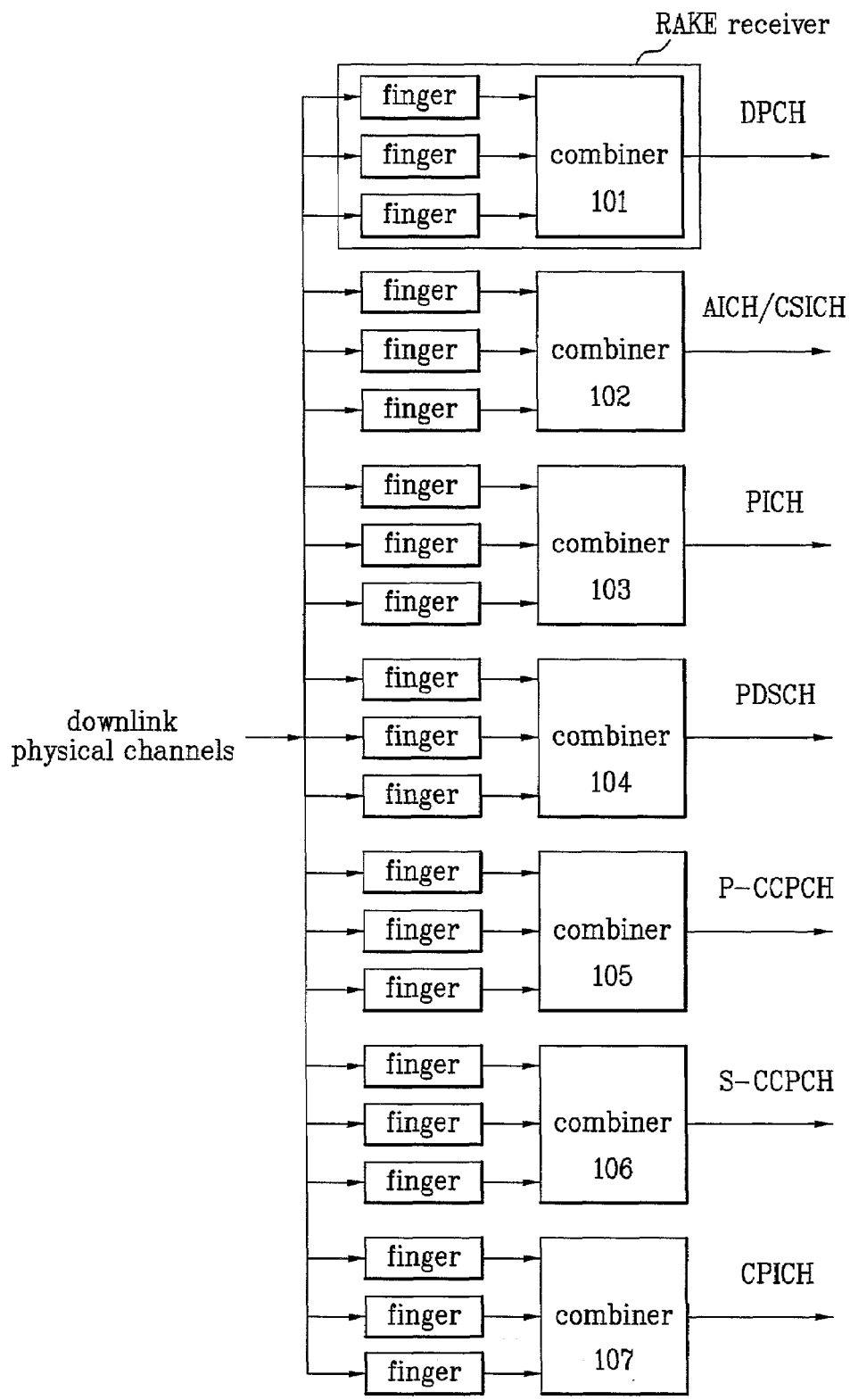

RECEIVER FOR MOBILE COMMUNICATION SYSTEM

This application claims the benefit of the Korean Application No. P2001-23999 filed on May 3, 2001, which is hereby incorporated by reference.

BACKGROUND OF THE INVENTION

1. Field of the Invention

The present invention relates generally to a mobile communication system, and more particularly, to a receiver capable of simplifying hardware required for finger and combiner in accordance with the channel characteristics in a mobile communication system using physical channels.

2. Discussion of the Related Art

Currently, the TSG (technical specification group) that belongs to the 3GPP has recommended a RAN (radio access network) standard.

In the RAN standard, transport channels and physical channels for use in physical layers have been prescribed.

The transport channels are defined by how and with what characteristics data is transferred over an air interface. The transport channels are for services offered by a layer-1 to higher layers.

The physical channels are defined by a specified carrier frequency, scrambling code, channelization code (optional), time start and stop (for giving a duration), and relative phase (i.e., 0 or $\pi/2$) on an uplink.

FIG. 1 is a view illustrating the mapping of transport channels onto physical channels. The transport channels are mapped onto the physical channels.

Under the assumption that the mobile communication system using already known rake receivers complies with the above-described 3GPP standard, a finger and combiner of rake receivers is configured as shown in FIG. 2.

FIG. 2 is a block diagram illustrating a conventional finger and combiner of rake receivers that satisfies the 3GPP standard.

Referring to FIG. 2, the finger and combiner of the rake receivers separates signals of one downlink physical channel received through several paths, demodulates and dispreads separated channels of the respective paths, and then combines demodulated and dispread channels.

Fingers take charge of the demodulation and dispreading process, and combiners 101~107 combine the paths.

However, according to the conventional finger and combiner, a configuration for combining the respective receiving paths with respect to all downlink physical channels being used should be provided.

Specifically, fingers should be provided for all the downlink physical channels inputted through respective receiving paths, and combiners 101~107 for combining outputs of the fingers should also be provided as many as the number of channels.

Currently, the rake receiver provided in the communication system separates signals of one channel inputted with time differences into three paths in the order of a power strength, and thus fingers as many as three times the number of channels and combiners 101~107 as many as the total number of channels are required to process all the downlink physical channels.

FIG. 2 exemplifies the use of seven downlink physical channels. In this case, the required number of fingers is 21 (i.e., 7*3), and the required number of combiners is 7.

Further, in case that the rake receiver is provided with searchers, i.e., fingers for continuously measuring the strength of a pilot signal, 22 fingers are required in total.

Consequendy, the conventional rake receivers have drawbacks in that in order to process the downlink physical channels of a mobile communication system, the whole hardware scale required for the fingers and combiner is increased. Also, since lots of logical operators used for the fingers and combiner are required, the circuit configuration is complicated, and the manufacturing cost is increased.

SUMMARY OF THE INVENTION

Accordingly, the present invention is directed to a receiver for a mobile communication system that substantially obviates one or more problems due to limitations and disadvantages of the related art.

An object of the present invention is to provide a receiver for a mobile communication system that can reduce the whole configuration of the receiver by grouping and constructing a finger and combiner of the rake receiver satisfying the characteristics of downlink physical channels.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a receiver for a mobile communication system includes fingers for performing a radio signaling of specified channels of multiple paths inputted with different time offsets, a combiner for summing the channels outputted from the fingers, and a selector for providing a select signal for controlling an output of the combiner.

In another aspect of the present invention, a rake receiver for a mobile communication system includes fingers for performing in parallel a radio signaling of downlink physical channels and inputted through multiple paths in a first-in first-out (FIFO) manner, combiners for summing a certain channel of different time offsets outputted from the fingers with an identical timing, and a selector for controlling the different physical channels outputted from the fingers to be summed by the different combiners, respectively.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a view illustrating the mapping of transport channels onto physical channels according to the mobile communication system.

FIG. 2 is a block diagram illustrating a conventional finger and combiner of rake receivers that satisfies the 3GPP standard.

DETAILED DESCRIPTION OF THE INVENTION

Figure 3:
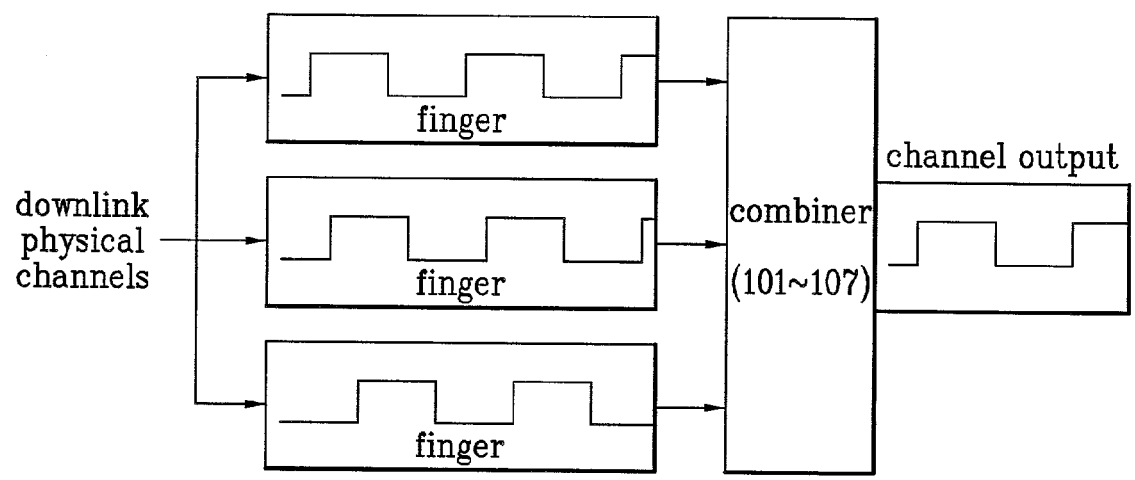
FIG. 3 is a view illustrating waveforms appearing in a general finger and combiner.

Reference will now be made in detail to the preferred embodiments of the present invention, examples of which are illustrated in the accompanying drawings. Wherever possible, the same reference numbers will be used throughout the drawings to refer to the same or like parts.

In the present invention, types of downlink physical channels are a P-CCPCH (primary common control physical channel), S-CCPCH (secondary common control physical channel), SCH (synchronization channel), DPCH (dedicated physical channel), PICH (paging indicator channel), PDSCH (physical downlink shared channel), AICH (acquisition indicator channel), CSICH (common packet channel status indicator channel), and CPICH (common pilot channel).

Prior to the detailed explanation of the present invention, the characteristics of the above-described channels will be explained.

The P-CCPCH, on which a cell SFN (system frame number) is transmitted, is used as a timing reference for all the physical channels.

The P-CCPCH is not transmitted during the first 256 chips of each slot. Instead, the primary SCH and the secondary SCH are transmitted during this period.

The S-CCPCH and the P-CCPCH have an identical frame length. The main difference between the primary P-CCPCH and the secondary S-CCPCH is that a BCH (transport channel) mapped onto the P-CCPCH can only have a fixed predefined transport format combination, while the S-CCPCH supports multiple transport format combinations using a TFCI (transport format combination indicator).

The SCH is a downlink signal used for a cell search. The SCH consists of two sub channels, i.e., the primary SCH and the secondary SCH. Radio frames of the primary SCH and the secondary SCH are divided into 15 slots, and the length of each slot corresponds to 2560 chips.

There are two types of downlink DPCH, compared as a time multiplex of a downlink DPDCH and a downlink DPCCH.

The DPCCH is used to carry control information. The control information consists of known pilot bits to support channel estimation for a coherent detection, transmit power control (TPC) commands, feedback information (FBI), and an optional transport-format combination indicator (TFCI). The DPDCH is used to carry dedicated data.

The PICH is a fixed rate physical channel used to carry paging indicators. The PICH is always associated with an S-CCPCH onto which a PCH transport channel is mapped.

Each PDSCH is associated with one downlink DPCH for each radio frame. The PDSCH and the associated DPCH do not necessarily have the same spreading factors, and are not necessarily frame-aligned.

If all relevant layer-1 control information is transmitted to the DPCCH part of the associated DPCH, the PDSCH does not carry the layer-1 information.

Further, a transmit diversity mode used for a PDSCH frame shall be the same as a transmit diversity mode used for the DPCH associated with this PDSCH frame. The transmit diversity mode on the associated DPCH may not change during the PDSCH frame and within the slot prior to the PDSCH frame.

The AICH is a fixed rate physical channel used to carry acquisition indicators (AI).

The AICH consists of a repeated sequence of 15 consecutive access slots (AS), and the length of each AS corresponds to 5120 chips. Each access slot consists of two parts, i.e., an acquisition-indicator (AI) part consisting of 32 real-valued symbols and a part of duration 1024 chips with no transmission that is not formally part of the AICH. The part of the slot with no transmission is reserved for possible use by the CSICH or for possible future use by other physical channels.

The CSICH is a fixed rate physical channel used to carry CPCH (common packet channel) status information. The CSICH is always associated with a physical channel used for transmission of the CPCH, and uses the same channelization and scrambling codes. The CSICH frame consists of 15 consecutive access slots (AS). Each access slot consists of two parts, i.e., a part of duration 4096 chips with no transmission that is not formally part of the CSICH, and a status indicator (SI) part consisting of 8 bits. The part of the slot with no transmission is reserved for use by the AICH. The modulation used by the CSICH is the same as for the PICH. The phase reference for the CSICH is the primary CPICH.

The CPCH status indicator (CSICH) mode defines the structure of information carried on the CSICH. There are two CSICH modes depending on whether a channel assignment is active or not. The CSICH mode defines the number of status indicators per frame and the content of each status indicator.

There are two types of the CPICH, i.e., a primary CPICH and a secondary CPICH.

The primary CPICH is a phase reference for the following downlink channels: the SCH, P-CCPCH, AICH, PICH, CSICH, DPCCH for the CPCH and the S-CCPCH. By default, the primary CPICH is also a phase reference for a downlink DPCH and any associated PDSCH.

The secondary CPICH may be a phase reference for a downlink DPCH. The secondary CPICH can be a phase reference for a downlink physical channel that uses open-loop transmission diversity instead of the primary CPICH that is the phase reference.

Figure 6:
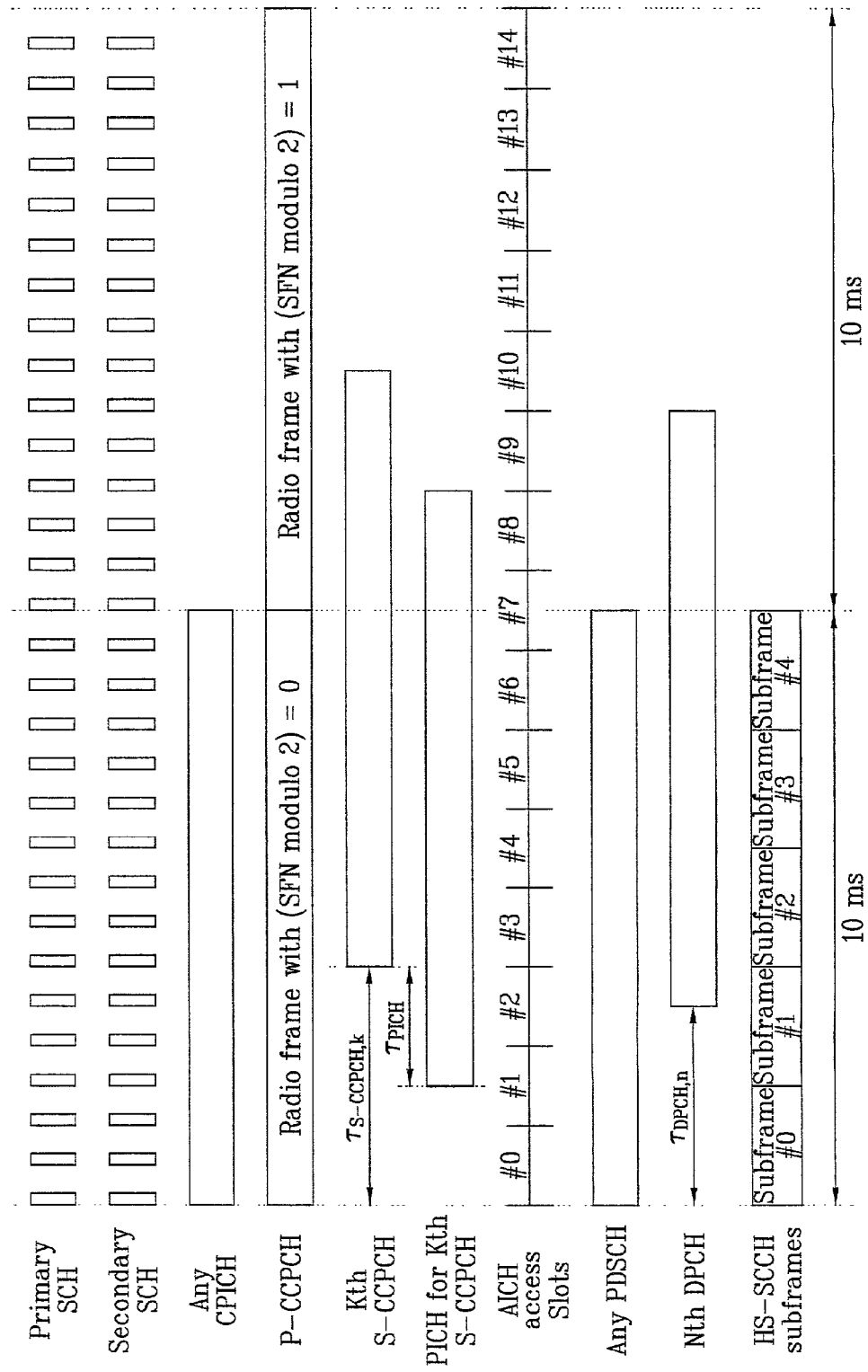
FIG. 6 is a view illustrating the frame timing of downlink physical channels.

FIG. 6 is a view illustrating the frame timing of downlink physical channels.

Referring to FIG. 6, the SCH (primary and secondary), CPICH (primary and secondary), P-CCPCH, and PDSCH have identical frame timings.

The S-CCPCH timing may be different for different S-CCPCHs, but the offset from the P-CCPCH frame timing is a multiple of 256 chips.

Figure 7:
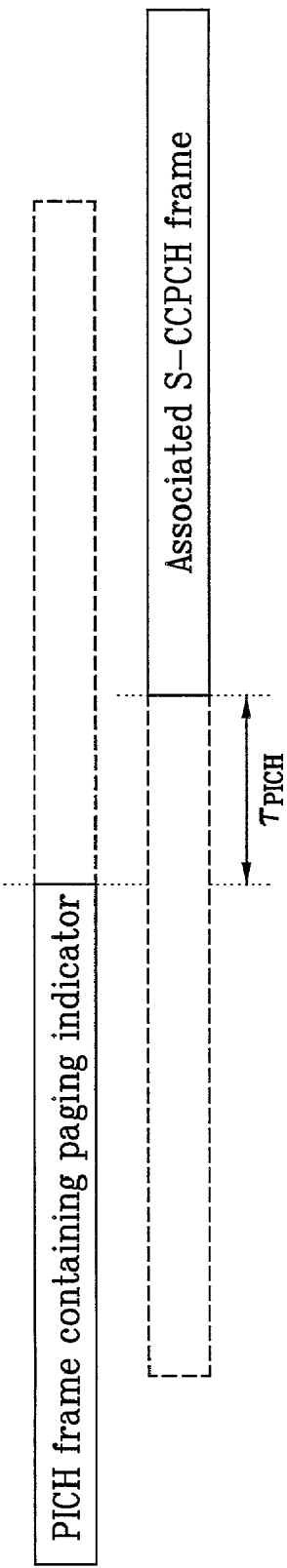
FIG. 7 is a view illustrating the timing relation between a PICH frame and an associated S-CCPCH frame.

The PICH timing is τPICH=7680 chips prior to its corresponding S-CCPCH frame timing, and the timing of the S-CCPCH carries the PCH transport channel with the corresponding paging information (See FIG. 7).

The AICH access slots #0 starts at the same time as the P-CCPCH frames with (SFN modulo 2)=0.

Figure 8:
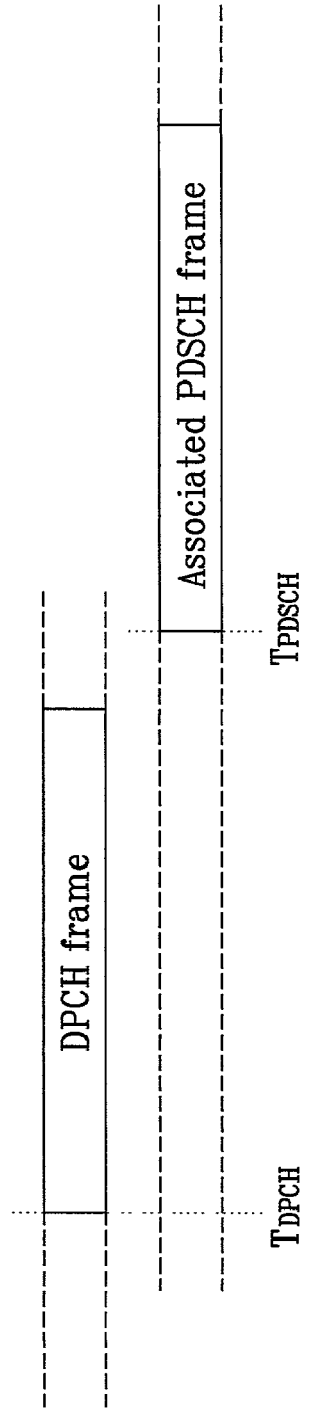
FIG. 8 is a view illustrating the timing relation between a DPCH frame and an associated PDSCH frame.

The relative timing of the associated PDSCH and the DPCH is described in FIG. 8.

The DPCH timing may be different for different DPCHs, but the offset from the P-CCPCH frame timing is a multiple of 256 chips.

The features of the present invention considering the above-described downlink physical channels will now be explained.

Figure 4:
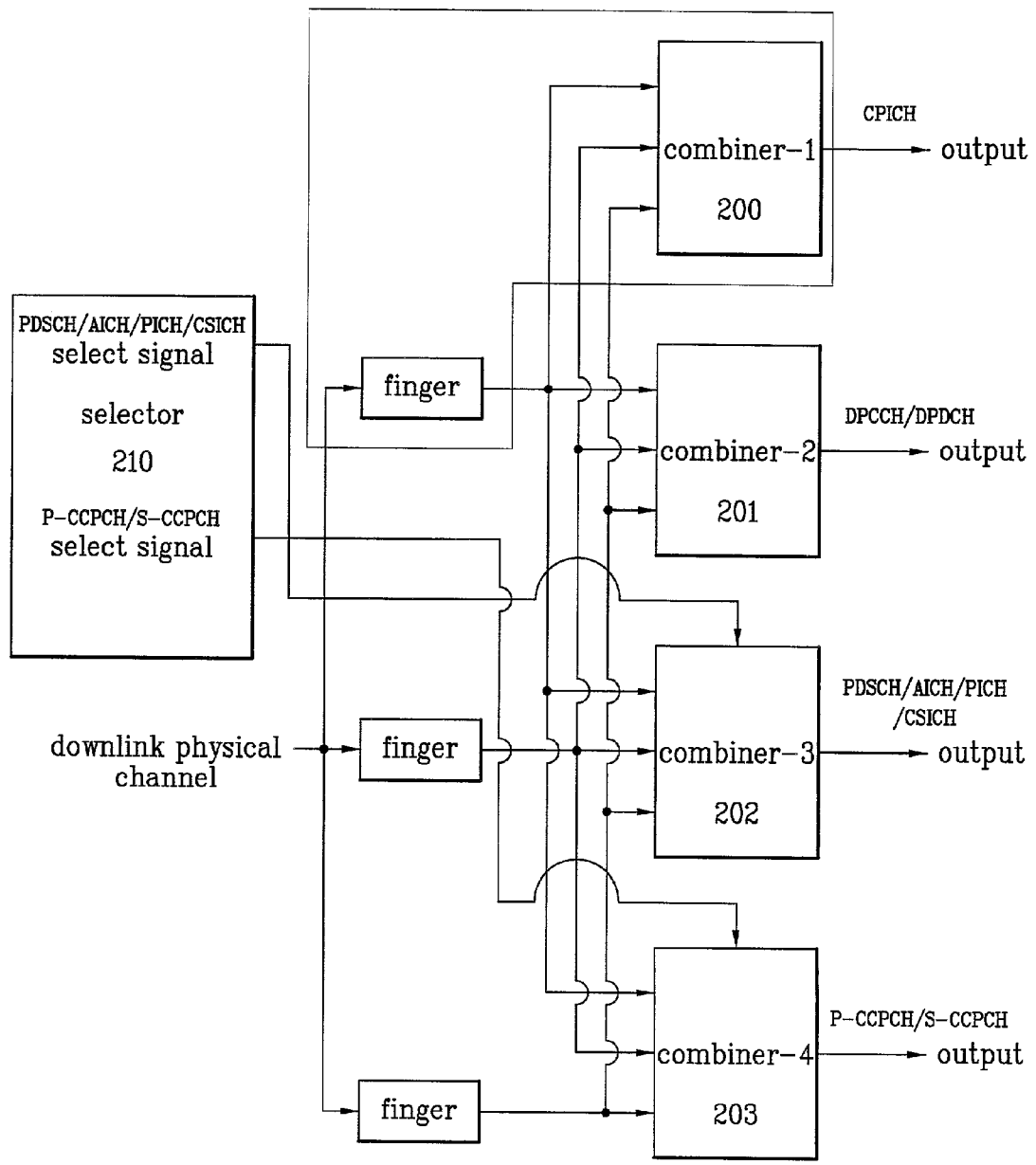
FIG. 4 is a view illustrating a finger and combiner of rake receivers according to a first embodiment of the present invention.

FIG. 4 is a view illustrating a finger and combiner of rake receivers according to a first embodiment of the present invention.

Referring to FIG. 4, the finger and combiner of rake receivers according to the present invention includes three fingers (i.e., first to third fingers on first to third paths), four combiners 200~203, and a selector 210.

The fingers take charge of a radio-signaling process including demodulation and dispreading of radio channels of multiple paths inputted with different time offsets, and the combiners 200~203 sum the paths of the respective fingers. That is, the combiners 200~203 sum the channels outputted from the fingers. Here, waveforms appearing in the respective fingers and combiners 200~203 are illustrated in FIG. 3.

FIG. 4 shows an example of a mobile communication system. A combiner-1 200 exclusively sums the CPICH among the downlink physical channels outputted from the fingers, and a combiner-2 201 exclusively sums the DPCH. A combiner-3 202 selectively sums one of the PDSCH, AICH, PICH, and CSICH, and a combiner-4 203 selectively sums one of the P-CCPCH and S-CCPCH.

A selector 210 is a kind of central processing unit (CPU), and provides a channel select signal selectively to the combiners 200~203 to control outputs of the corresponding combiners.

The fingers output in parallel a plurality of different physical channels, and the selector 210 provides the channel select signal for controlling the channel selection to the combiners 200~203 so that the identical channel is summed in the same combiner.

Specifically, when the plural physical channels are outputted in series from the fingers, the selector 210 provides the select signal for a channel-1 to the combiner-1 200 so that one physical channel is summed in the combiner-1 200, and simultaneously provides the select signal for a channel-2 to the combiner-2 201 so that another physical channel is summed in the combiner-2 201.

If the downlink physical channels are outputted from the fingers, the selector 210 provides the select signal for the CPICH to the combiner-1 200 that exclusively sums the CPICH, and provides the select signal for the DPCH to the combiner-2 201 that exclusively sums the DPCH. Also, the selector 210 provides the select signal for an X-CH (here, X=PDS, AI, PI, or CSI) for the channel selection to the combiner-3 202 that selectively sums one of the PDSCH, AICH, PICH, and CSICH, and provides the select signal for an Y-CCPCH (here, Y=P or S) for the channel selection to the combiner-4 203 that selectively sums one of the P-CCPCH and S-CCPCH.

Preferably, since the combiner-1 200 and the combiner-2 201 exclusively sum one physical channel, the selector 210 may not provide a separate select signal for the channel selection to the combiner-1 200 and the combiner-2 201.

The configuration of FIG. 4 performs grouping of the channels that have no data loss or that are not received with the same timing even if the same receiving path is used among the physical channels used in the downlink.

Hereinafter, the configuration of the present invention according to the channel grouping will be explained.

Since the primary CPICH is a phase reference for downlink channels such as the SCH, P-CCPCH, AICH, PICH, CSICH, DPCCH for the CPCH, S-CCPCH, DPCH, and any associated PDSCH, and is used for the phase compensation, the CPICH is configured separately from other downlink channels.

Accordingly, the combiner-1 200 exclusively sums the CPICH among the downlink physical channels outputted from the fingers.

Among the DPCH, the DPCCH is used to carry control information, and the DPDCH is used to carry dedicated data. This DPCH is mapped onto the DCH (transport channel) used to carry user and control information between the system (UTRAN) and the terminal (UE). The most important thing is that the DPCH is exclusively used for a specific terminal. The actual reason why the system (UTRAN) communicates with the terminal (UE) is information being transmitted through the DPCH, and this information should not be damaged. Thus, in the present invention, the DPCH is configured separately from other downlink channels.

The combiner-2 201 exclusively sums the DPCH among the downlink physical channels outputted from the fingers.

The combiner-3 202 selectively sums one of the PDSCH, AICH, PICH, and CSICH outputted from the fingers, and the combiner-4 203 selectively sums one of the P-CCPCH and S-CCPDH outputted from the fingers.

The reason why the combiner-3 202 and the combiner-4 203 are configured to selectively sum one of various physical channels is to consider the channel characteristic and the transmission timing of the channel according to the 3GPP standard.

In other words, the AICH may be configured to use the same combiner as other physical channels. As described above, this is because the part of the slot with no transmission is reserved for a possible use by the CSICH or for a possible future user by other physical channels.

Meanwhile, the P-CCPCH, on which the cell SFN (system frame number) is transmitted, is used as a timing reference for all the physical channels. Accordingly, the P-CCPCH is configured separately from other downlink channels. Also, since the S-CCPCH and the P-CCPCH have different transmission timings, these two channels are configured to use one combiner.

Also, since the channels such as AICH, PICH, and CSICH for transmitting the indicators do not perform the transmission at the same time in view of their roles, they are configured to use the same combiner.

Consequently, the combiners 200~203 according to the present invention sum four channels at maximum at the same timing, and simultaneously outputs data of the channels.

Now, the configuration and operation of the rake receiver according to another embodiment of the present invention will be explained with reference to FIG. 5. Here, the receiver illustrated in FIG. 5 is mounted on the mobile communication system complying with the 3GPP standard.

Figure 5:
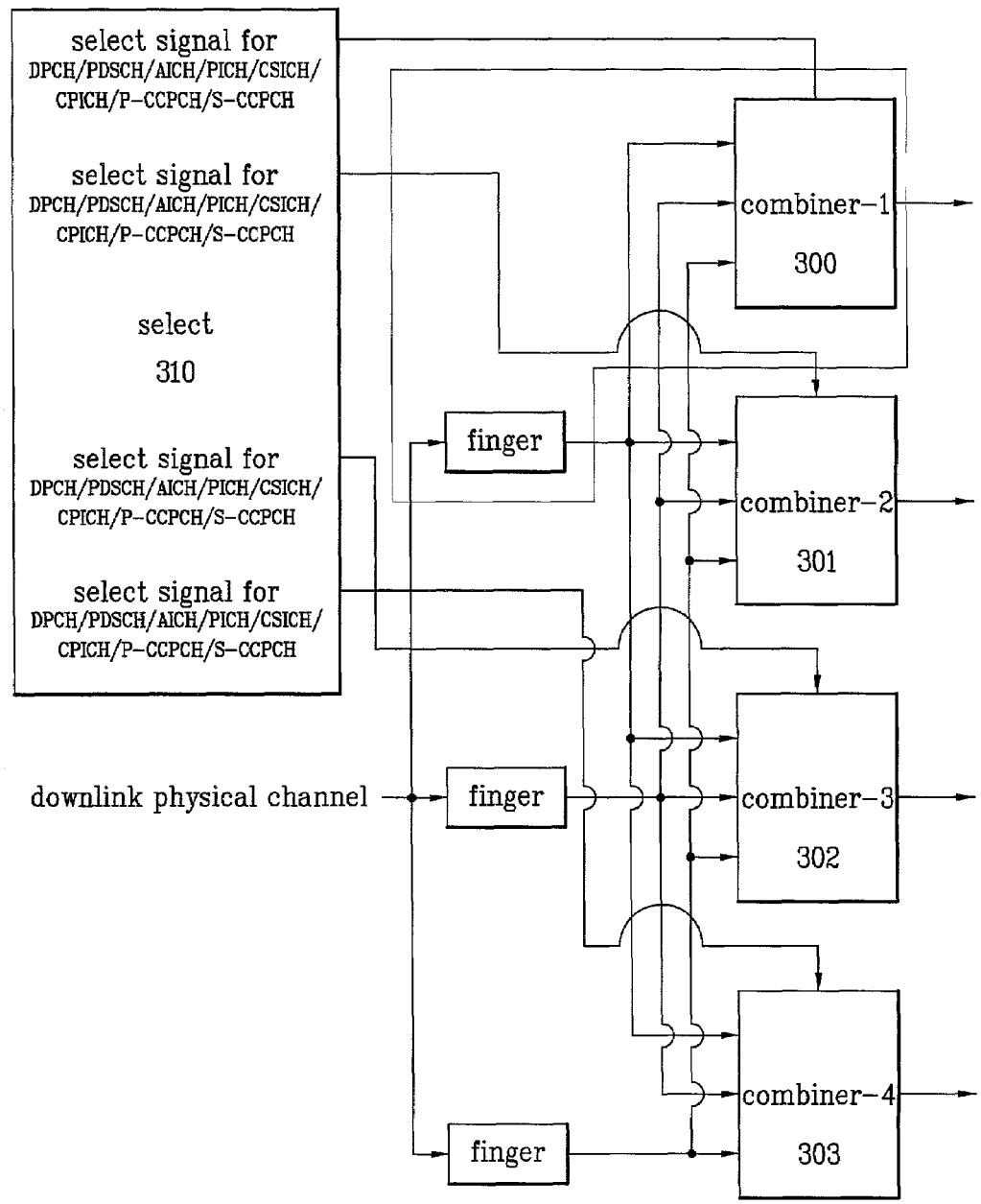
FIG. 5 is a view illustrating a finger and combiner of rake receivers according to a second embodiment of the present invention.

The fingers illustrated in FIG. 5 is the same as the fingers illustrated in FIG. 4 in function and operation, and thus the following explanation of the fingers is also applied to the fingers illustrated in FIG. 4 in the same manner.

When the downlink physical channels recommended in the 3GPP standard are received through the multiple paths, the fingers perform in parallel the radio signaling of the respective channels in the FIFO (first-in first-out) manner. Specifically, first coming downlink physical channel is first processed, and in case that a downlink physical channel having different time offsets is divided into three paths, the corresponding channel is demodulated and dispread through the respective divided path.

Then, combiners 300~303 sum one physical channel of different time offsets sequentially outputted from the fingers with the same timing. At this time, a selector 310 controls the different physical channels outputted from the fingers to be summed by the different combiners 300~303, respectively.

Specifically, among the combiners 300~303, the combiner-1 300 sums first physical channels outputted with different time offsets from the fingers with one timing, and the combiner-2 301 sums second physical channels outputted with different time offsets from the fingers with one timing. Also, the combiner-3 302 sums third physical channels outputted with different time offsets from the fingers with one timing, and the combiner-4 303 sums fourth physical channels outputted with different time offsets from the fingers with one timing. Here, the first to fourth do not denote the input order, but denote symbols for representing different physical channels.

The control operation of the selector 310 with respect to the combiners 300~303 will now be explained. The selector 310 inputs the select signal for the first physical channel to the combiner-1 300 to sum the first physical channel among the downlink physical channels, and the select signal for the second physical channel to the combiner-2 301 to sum the second physical channel. Also, the selector 310 inputs the select signal for the third physical channel to the combiner-3 302 to sum the third physical channel, and the select signal for the fourth physical channel to the combiner-4 303 to sum the fourth physical channel.

Consequently, the selector 310 inputs the select signals to the respective combiners 300~303 so that the different physical channels are divided and inputted to the different combiners 300~303, respectively, and the respective combiner selectively sums one of the divided physical channels.

As described above, the receiver for a mobile communication system according to the present invention can greatly reduce the number of combiners and the number of fingers in comparison to the conventional receiver, and thus the whole hardware scale of the receiver can be greatly reduced.

Also, since the receiver according to the present invention can reduce the hardware size of the receiver without any loss on the downlink physical channels, the deterioration of the whole performance of the system due to the hardware reduction can be prevented. Also, the receiver according to the present invention can improve the economical efficiency through the reduction of power consumption and logical operators being used.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A receiver for a mobile communication system comprising:
   a plurality of fingers, each finger receiving a plurality of channels, wherein each channel belongs to a corresponding one of a plurality of channel groups;
   a plurality of combiners to receive signals output from the fingers and each combiner to separately output signals of a corresponding channel group;
   a selector to output a channel select signal to select a channel, wherein each combiner receives the channel select signal from the selector and outputs a corresponding channel of the respective channel group for that combiner based on the channel select signal,
   wherein each channel in a same channel group has a different transmission timing.

2. The receiver as claimed in claim 1, wherein the multiple channels are physical channels.

3. The receiver as claimed in claim 1, wherein one of the plurality of combiners combines and outputs a common pilot channel (CPICH).

4. The receiver as claimed in claim 1, wherein one of the plurality of combiners combines and outputs one of a dedicated physical control channel (DPCCH) and a dedicated physical data channel (DPDCH).

5. The receiver as claimed in claim 1, wherein one of the plurality of combiners combines and outputs one of a physical downlink shared channel (PDSCH), an acquisition indicator channel (AICH), a paging indicator channel (PICH) and a common packet channel status indicator channel (CSICH).

6. The receiver as claimed in claim 1, wherein one of the plurality of combiners combines and outputs one of a primary common control physical channel (P-CCPCH) and a secondary common control physical channel (S-CCPCH).

7. A rake receiver for a mobile communication system comprising:
   a plurality of fingers, each finger receiving a plurality of channels with different time offset in a first-in first-out (FIFO) manner;
   a plurality of combiners combining signals received from the plurality of fingers at the different time offset and each combiner outputting signals of a different one of a plurality of channel groups, and each combiner outputting a separate channel according to select signals, wherein a first combiner outputs signals of a first selected channel of a first channel group based on a first select signal received at the first combiner and outputs signals of a second selected channel of the first channel group based on the first select signal; and
   a selector selecting physical channels corresponding to each combiner and inputting the select signals to the combiners,
   wherein the first selected channel and the second selected channel in the first channel group have a different transmission timing.

8. The rake receiver as claimed in claim 7, wherein the selector selects a channel corresponding to one combiner, and the selected channel is selected from a channel group corresponding to the one combiner.

9. The rake receiver as claimed in claim 7, wherein the plurality of channel groups include: a first group comprising a common pilot channel (CPICH), a second group comprising a dedicated physical control channel (DPCCH) and a dedicated physical data channel (DPDCH), a third group comprising a physical downlink shared channel (PDSCH), an acquisition indicator channel (AICH), a page indicator channel (PICH) and a common packet channel status indicator channel (CSICH), and a fourth group comprising a primary common control physical channel (P-CCPCH) and a secondary common control physical channel (S-CCPCH).

10. A receiver comprising:

a plurality of fingers to collectively receive a plurality of channels, each of the channels corresponding to one of a plurality of channel groups;

a plurality of combiners each coupled to the plurality of fingers, wherein each combiner outputs signals of a different one of the channel groups, and at least one of the plurality of combiners associates with at least two channels of the plurality of channels, the at least two channels corresponding to one channel group; and a selector to provide a channel select signal to the at least one of the plurality of combiners, the channel select signal to control summing of outputs of the plurality of fingers at the at least one of the plurality of combiners such that the at least one of the plurality of combiners outputs a first channel or a second channel based on the channel select signal, wherein each separate channel in a same channel group is received at different ones of the fingers at different times.

11. The receiver as claimed in claim 10, wherein when the plurality of channels are outputted in parallel from the plurality of fingers, the selector provides the channel select signal for controlling channel selection to the at least one combiner so that identical channels are each summed in the at least one combiner.

12. The receiver as claimed in claim 10, wherein when the plurality of channels are outputted in series from the fingers, the selector provides a first channel select signal for a first channel to a first combiner so that one physical channel is summed in the first combiner, and provides a second channel select signal for a second channel to a second combiner so that another physical channel is summed in the second combiner.

* * * * *